US011910179B2

(12) United States Patent
Sobierajski (10) Patent No.: US 11,910,179 B2
(45) Date of Patent: Feb. 20, 2024

(54) GENERATING ACOUSTIC REPRESENTATIONS OF VIRTUAL OBJECTS (71) Applicant: International Business Machines Corporation, Armonk, NY (US)

(72) Inventor: Mark Sobierajski, Pound Ridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 290 days.

(21) Appl. No.: 17/480,680

(22) Filed: Sep. 21, 2021

(65) Prior Publication Data

US 2023/0092083 A1    Mar. 23, 2023

(51) Int. Cl.
*H04S 7/00* (2006.01)
*G06F 3/01* (2006.01)
*G06T 17/00* (2006.01)

(52) U.S. Cl.
CPC .............. *H04S 7/303* (2013.01); *G06F 3/011* (2013.01); *G06T 17/00* (2013.01)

(58) Field of Classification Search
None
See application file for complete search history.

(56) References Cited

U.S. PATENT DOCUMENTS

| 9,658,693 | B2 | 5/2017 | Levesque et al. |
| 9,898,089 | B2 | 2/2018 | Subramanian et al. |
| 10,133,353 | B2 | 11/2018 | Eid |
| 10,228,653 | B2 | 3/2019 | Ochiai et al. |
| 11,462,232 | B1* | 10/2022 | Wang ........................ H04R 5/04 |
| 2019/0369731 | A1 | 12/2019 | Verbeke et al. |
| 2020/0103974 | A1 | 4/2020 | Carter et al. |
| 2021/0082191 | A1* | 3/2021 | Tajik ................... H04N 21/8106 |
| 2021/0279957 | A1* | 9/2021 | Eder ........................ G06N 3/08 |

FOREIGN PATENT DOCUMENTS

EP    3616033 A1    3/2020

OTHER PUBLICATIONS

Marchal et al.; "Can Stiffness Sensations be Rendered in Virtual Reality Using Mid-air Ultrasound Haptic Technologies?"; EUROHAPTICS 2020—12th International Conference on Haptics; hal-02528180; Sep. 2020; pp. 1-8.

* cited by examiner

*Primary Examiner* — Qin Zhu
(74) *Attorney, Agent, or Firm* — CANTOR COLBURN LLP; L. Jeffrey Kelly (57) ABSTRACT Examples described herein provide a computer-implemented method that includes receiving virtual object data about a virtual object in a virtual reality environment. The method further includes determining a shape of the virtual object. The method further includes determining a pose of the virtual object in the virtual reality environment. The method further includes creating, based at least in part on the shape of the virtual object and the pose of the virtual object, an acoustic representation of the virtual object within a real-world environment using at least one electroacoustic transducer to generate acoustic signals.

20 Claims, 9 Drawing Sheets

GENERATING ACOUSTIC REPRESENTATIONS OF VIRTUAL OBJECTS

BACKGROUND

Embodiments described herein generally relate to acoustics, and more specifically, to generating acoustic representations of virtual objects.

Virtual reality (VR) uses computer technology to immerse users into a simulated environment. For example, a VR system uses video, audio, tactile feedback, and the like to stimulate the user's senses. Users can experience the simulated environment using devices like head-mounted displays (HMD), full-room displays, speakers, etc. and can interact with the simulated environment. For example, responsive to a sound being emitted relative to the user's right side, the user (wearing a HMD) can turn his or her head to the right to look in the direction of the sound. The HMD, using one or more sensors, can detect the movement and adjust the view of the simulated environment that the user sees on the HMD to coincide with the user's movement. That is, the user's view will change according to the user's movement.

SUMMARY

In one exemplary embodiment, a computer-implemented method for generating acoustic representations of virtual objects is provided. The method includes receiving virtual object data about a virtual object in a virtual reality environment. The method further includes determining a shape of the virtual object. The method further includes determining a pose of the virtual object in the virtual reality environment. The method further includes creating, based at least in part on the shape of the virtual object and the pose of the virtual object, an acoustic representation of the virtual object within a real-world environment using at least one electroacoustic transducer to generate acoustic signals.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

VR enables a user to become immersed in a simulated environment. The simulated environment created by VR changes nearly instantly; however, the real-world (physical world) around a user using VR does not. For example, if a user in a VR environment "picks up" an object and moves it from one location to another, there is no real-world effect that the user can experience to enhance the action. The user does not actually touch a physical object or move it. Rather, the VR system merely simulates this action with video, audio, etc.

One or more embodiments of the present invention provide for generating quasi-solid surfaces using acoustic particles. For example, acoustic particles can be generated from one or more speakers in a uniform way to create quasi-solid surfaces of constant air pressure. The quasi-solid surfaces can be arranged to create quasi-solid three-dimensional (3D) objects having a particular shape. These quasi-solid 3D objects can be used in conjunction with VR to bring even more reality to simulated environments. For example, in a VR environment that includes virtual furniture, the present techniques provide for generating real-world representations of the virtual furniture by generating quasi-solid 3D furniture using acoustic particles.

According to one or more embodiments described herein, an electroacoustic transducer the projects sound waves in such a way that they contain themselves from continued propagation beyond desired dimensions. More specifically, these sound waves create one or more force fields with the molecules in the medium that the sound waves happen to traverse through, such as air, which is mostly nitrogen, some oxygen, and various other elements. The electroacoustic transducer converts electrical energy into acoustical energy but only project it in the dimensions that are desired, such as to replicate a virtual object from a VR environment.

Figure 1:
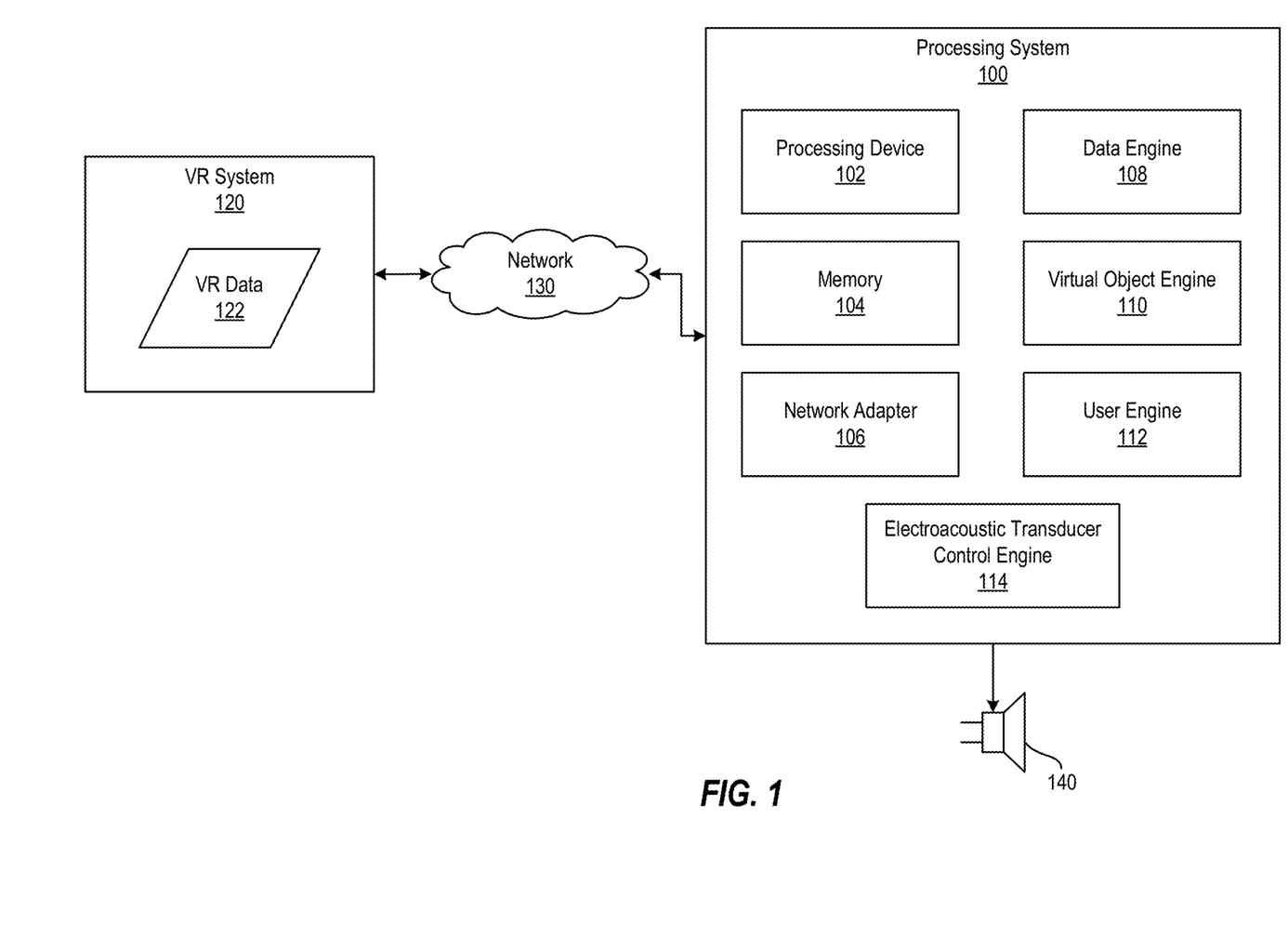
FIG. 1 depicts a block diagram of a processing system for generating acoustic representations of virtual objects according to one or more embodiments described herein

FIG. 1 depicts a block diagram of a processing system for generating acoustic representations of virtual objects according to one or more embodiments described herein. The various components, modules, engines, etc. described regarding FIG. 1 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 102 for executing those instructions. Thus a system memory (e.g., memory 104) can store program instructions that when executed by the processing device 102 implement the engines described herein. Other engines can also be utilized to include other features and functionality described in other examples herein.

Figure 6:
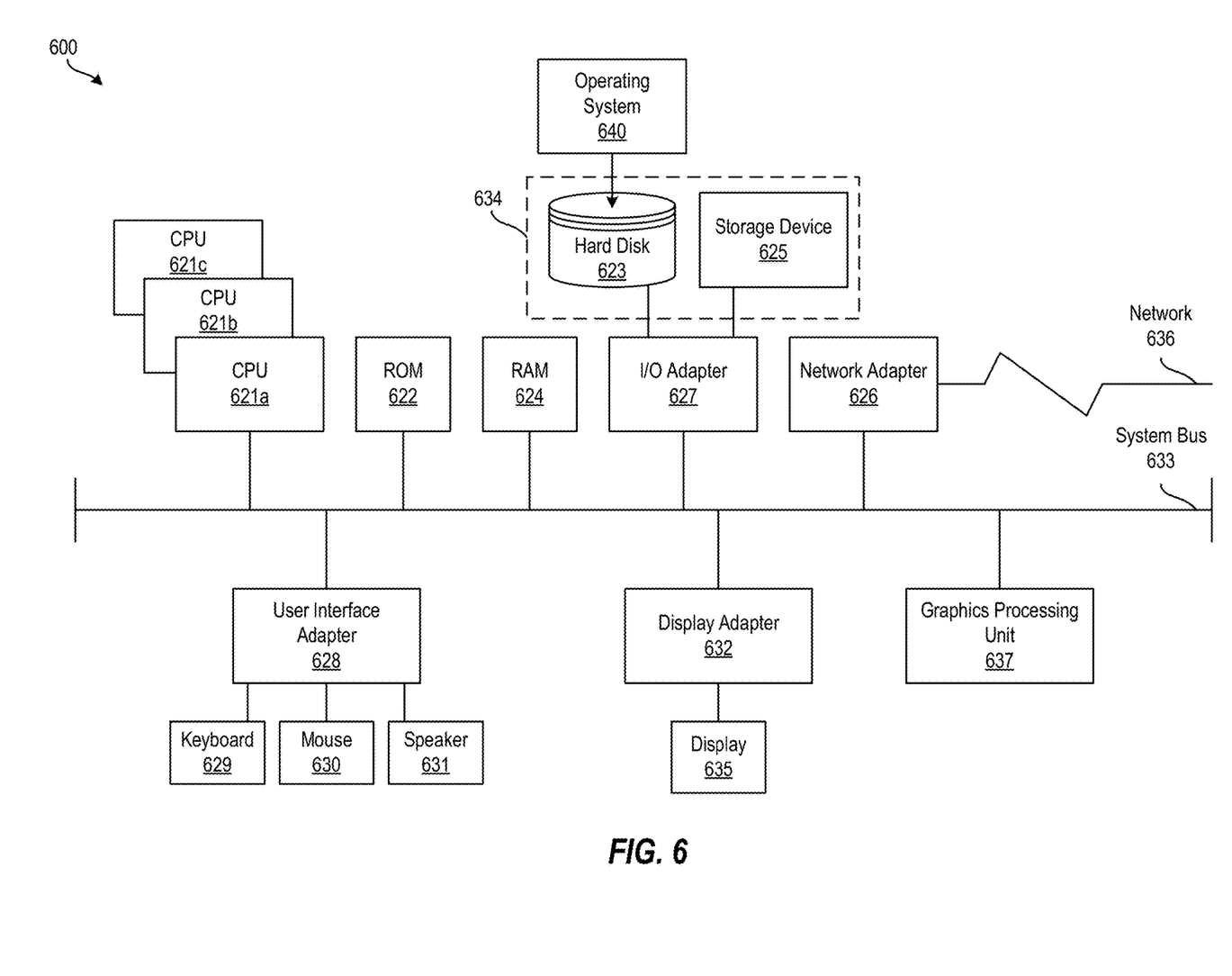
FIG. 6 depicts a block diagram of a processing system for implementing the presently described techniques according to one or more embodiments described herein.

The processing system 100 can further include a network adapter 106 (e.g., the network adapter 626 of FIG. 6). The network adapter 106 enables the processing system 100 to transmit data to and/or receive data from other sources, such as other processing systems, data repositories, and the like. As an example, the processing system 100 can transmit data to and/or receive data from a VR system 120 directly and/or via a network 130.

The network 130 represents any one or a combination of different types of suitable communications networks such as, for example, cable networks, public networks (e.g., the Internet), private networks, wireless networks, cellular networks, or any other suitable private and/or public networks. Further, the network 130 can have any suitable communication range associated therewith and may include, for example, global networks (e.g., the Internet), metropolitan area networks (MANs), wide area networks (WANs), local area networks (LANs), or personal area networks (PANs). In addition, the network 130 can include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

The processing system 100 includes a data engine 108, a virtual object engine 110, a user engine 112, and an electroacoustic transducer control engine 114. The data engine 108 receives data, also referred to as virtual object data, from any suitable source. As one example, the data engine 108 receives VR data 122 from the VR system 120. As another example, the data engine 108 receives 3D model data such as computer aided design (CAD) data from a CAD source (e.g., CAD software). The virtual object engine 110 determines characteristics about a virtual object, such as the object's shape, pose, etc. As used herein, pose refers to the location (e.g., expressed as (x,y,z) coordinates) and orientation (e.g., expressed as pitch, roll, yaw) of an object, person, etc., relative to some coordinate system. The user engine 112 determines characteristics about a user using the VR system 120, such as the user's pose. The electroacoustic transducer control engine 114 controls an electroacoustic transducer 140 to cause the electroacoustic transducer 140 create an acoustic representation of the virtual object within a real-world environment. The electroacoustic transducer 140 generates acoustic signals to create the acoustic representation. It should be appreciated that the electroacoustic transducer 140 can include one or more electroacoustic transducers, which may be positioned within the real-world environment. The features and functionality of the engines 108, 110, 112, 114 are now further described with reference to FIGS. 2 and 3.

Figure 2:
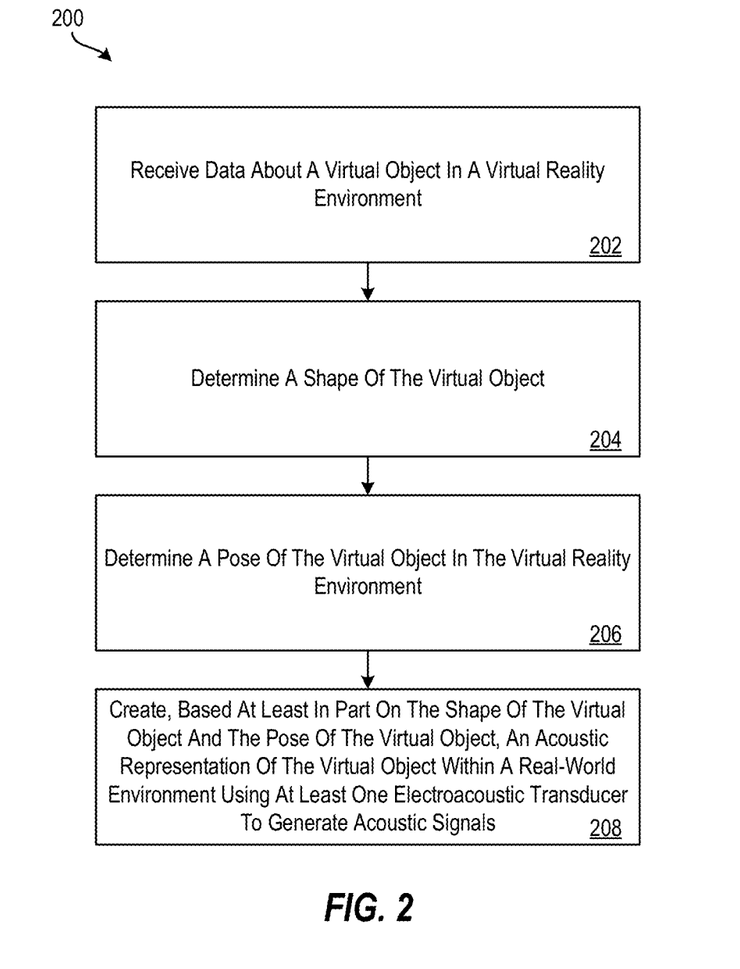
FIG. 2 depicts a flow diagram of a method for generating acoustic representations of virtual objects according to one or more embodiments described herein.

Particularly, FIG. 2 depicts a flow diagram of a method 200 for generating acoustic representations of virtual objects according to one or more embodiments described herein.

The method 200 can be implemented by any suitable system (e.g., the processing system 100 of FIG. 1, the cloud computing node 10 of FIG. 4, the processing system 600 of FIG. 6, etc.), any suitable device (e.g., the processing device 102 of FIG. 1, the processing device 621 of FIG. 6, etc.), and/or the like, including combinations thereof. FIG. 2 is now described in more detail with reference to FIGS. 1 and 3, but is not intended to be so limited.

At block 202, the processing system 100 receives data (e.g., the VR data 122) about a virtual object in a virtual reality environment. The VR data 122 can be in the form of a point cloud or other suitable form.

At block 204, the processing system 100 determines a shape of the virtual object. Determining the shape of the object can include determining one or more points, one or more line or curves, one or more 2D surfaces (e.g., planar surfaces/regions), one or more 3D volumes (e.g., one or more 3D primitives (e.g., cubes, pyramids, cones, spheres, tori, wedges, etc.)), including combinations thereof and the like. According to one or more embodiments described herein, the processing system 100 can use mathematical operations to calculate the shape of the virtual object using one or more data points in the VR data 122. In other examples, the VR data 122 can define the shape of the virtual object.

At block 206, the processing system 100 determines a pose of the virtual object in the virtual reality environment. The pose refers to the location (e.g., expressed as (x,y,z) coordinates) and orientation (e.g., expressed as pitch, roll, yaw) of the virtual object relative to a coordinate system for the VR environment. According to one or more embodiments described herein, the processing system 100 can use mathematical operations to calculate the pose of the virtual object using one or more data points in the VR data 122. In other examples, the VR data 122 can define the pose of the virtual object.

At block 208, the processing system 100 creates, based at least in part on the shape of the virtual object and the pose of the virtual object, an acoustic representation of the virtual object within a real-world environment using at least one electroacoustic transducer to generate acoustic signals. The processing system 100 sends a signal(s) to the electroacoustic transducer 140 via the electroacoustic transducer control engine 114 to cause the electroacoustic transducer 140 to generate an acoustic signal (e.g., a waveform). The acoustic signals may be generated at a frequency outside the range of traditional human hearing (e.g., outside the range of approximately 20 Hz to 20 kHz) although other frequencies are possible. Thus, in some examples, a human user can detect the acoustic signals, such as by touch, but cannot hear the acoustic signals. The electroacoustic transducer 140 uses acoustic waves to manipulate particles of a medium (e.g., air) to create the acoustic representation.

It should be appreciated that the electroacoustic transducer 140 represents one or more electroacoustic transducers. For example, the electroacoustic transducer 140 can include a first electroacoustic transducer and a second electroacoustic transducer. The first electroacoustic transducer can be disposed within the real-world environment in a known relationship to the second electroacoustic transducer, such as shown in FIGS. 3B, 3D. According to one or more embodiments described herein, multiple electroacoustic transducers can be arranged in a cluster to project specific frequencies to cancel out the propagation of electroacoustic transducers. The orb of acoustic particles will then align into a consistent modal state generating air pressure like force field representative of the virtual object. This could be in layers or just the outer shell. These acoustic particles/ molecules exert approximately equal outward forces at approximately equal distances apart generating a "bed of nails" effect to create surfaces, which can support objects or human beings (e.g., an acoustic representation can be a surface that a human can walk on or an object can be placed on).

In some examples, as described with reference to FIGS. 3A-3D, the acoustic representation can be planes or other surfaces of constant air pressure that are created by the electroacoustic transducer 140. These planes or other surfaces of constant air pressure can be arranged to create representations of objects in the real-world with specific dimensions that can be observed (e.g., by touch) in the real-world environment. In some examples, the planes or other surfaces of constant air pressure can support physical objects or beings (e.g., a person).

Further, these planes or other surfaces of constant air pressure are created, in a real-world environment, in such a way as to represent the virtual object in the VR environment. This enables the real-world environment to change as the VR environment changes. For example, if the shape or pose of the VR object changes in the VR environment, the planes or other surfaces of constant air pressure created by the electroacoustic transducer 140 can change in the real-world environment to approximate the change in the VR environment. According to one or more embodiments described herein, the processing system 100 can detect a change of at least one of the shape of the virtual object or the pose of the virtual object. The processing system 100 can then adjust the acoustic representation of the virtual object within the real-world environment based at least in part on the change of at least one of the shape of the virtual object or the pose of the virtual object.

Additional processes also may be included. For example, the processing system can determine a pose of a user interacting with the virtual reality environment. In another example, the processing system 100 can detect a change of the pose of the user and can then adjust the acoustic representation of the virtual object within the real-world environment based at least in part on the change of the pose of the user.

It should be understood that the process depicted in FIG. 2 represents an illustration, and that other processes may be added or existing processes may be removed, modified, or rearranged without departing from the scope of the present disclosure.

Figure 3A:
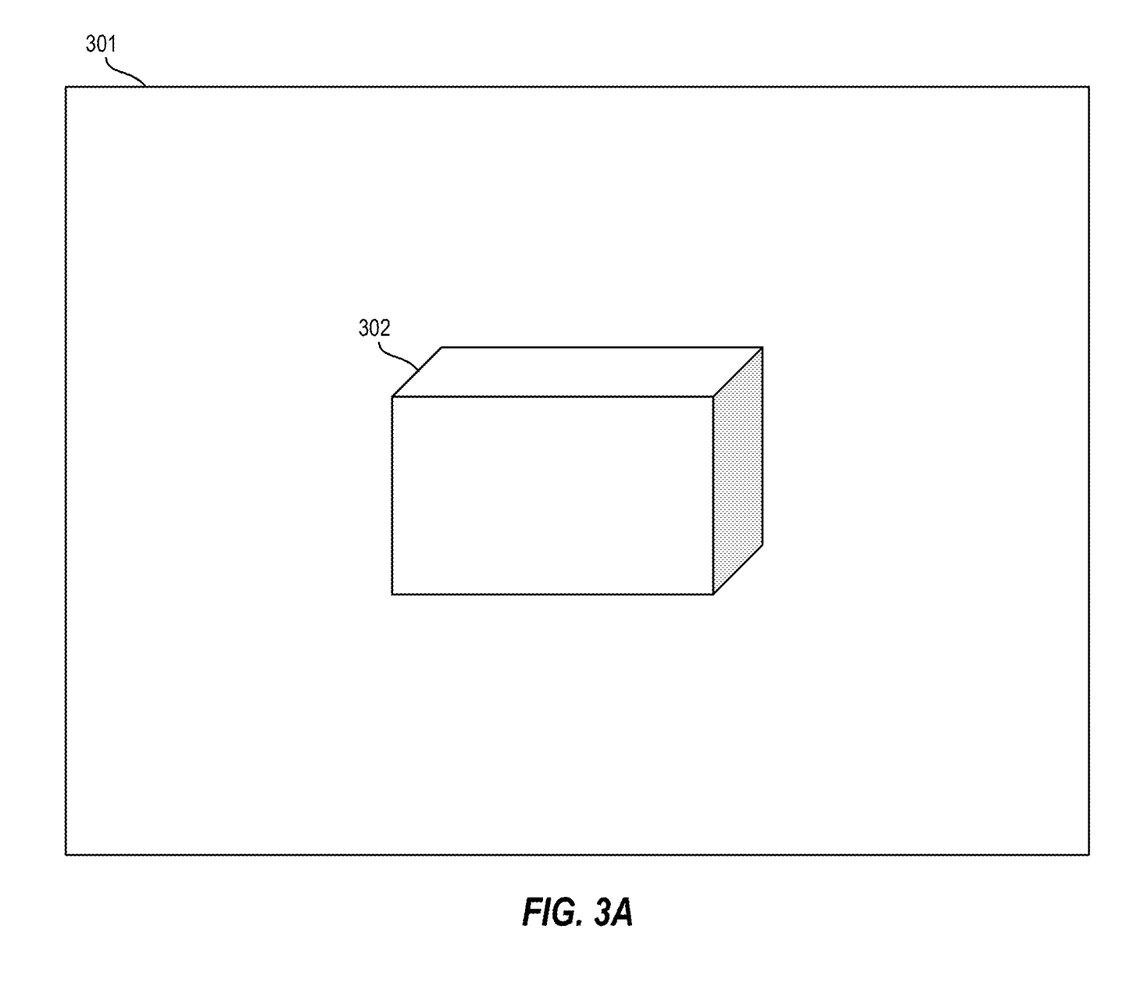
FIG. 3A depicts a virtual reality environment according to one or more embodiments described herein.
Figure 3B:
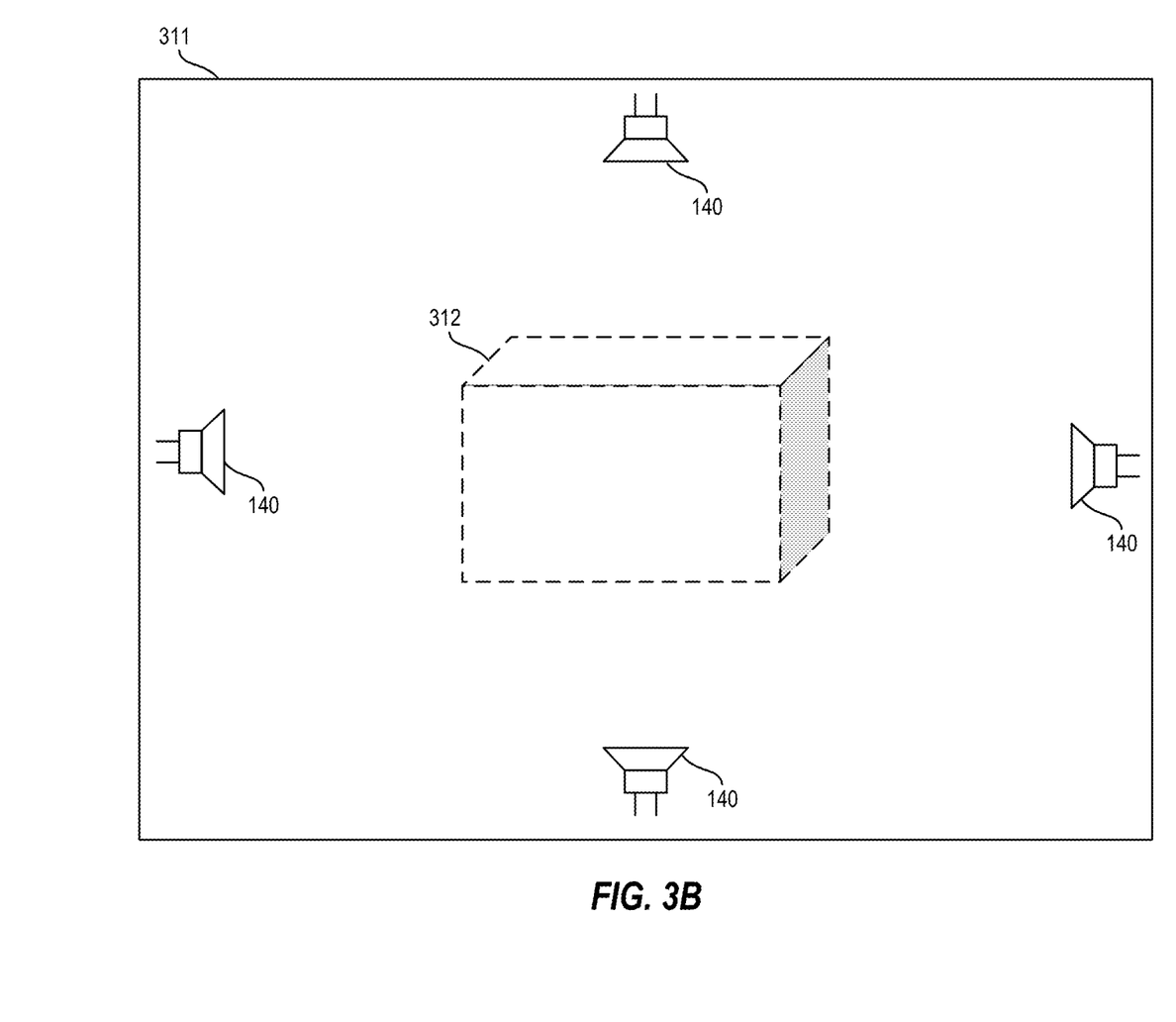
FIG. 3B depicts a real-world environment according to one or more embodiments described herein.

FIG. 3A depicts a virtual reality environment 301 according to one or more embodiments described herein. FIG. 3B depicts a real-world environment 311 according to one or more embodiments described herein. The VR environment 301 includes a virtual object 302. Although shown as a 3D box, the virtual object 302 can be any suitable shape or size. The virtual object 302 has a pose associated therewith relative to the VR environment 301. The processing system 100, according to one or more embodiments described herein, uses data (e.g., the VR data 122) about the virtual object 302 to determine a shape and pose of the virtual object 302. Then, the processing system 100 can cause an acoustic representation 312 to be created, based at least in part on the shape of the VR object 302 and the pose of the VR object 302, within a real-world environment 304 of FIG. 3B using the electroacoustic transducer 140 to generate acoustic signals.

Figure 3C:
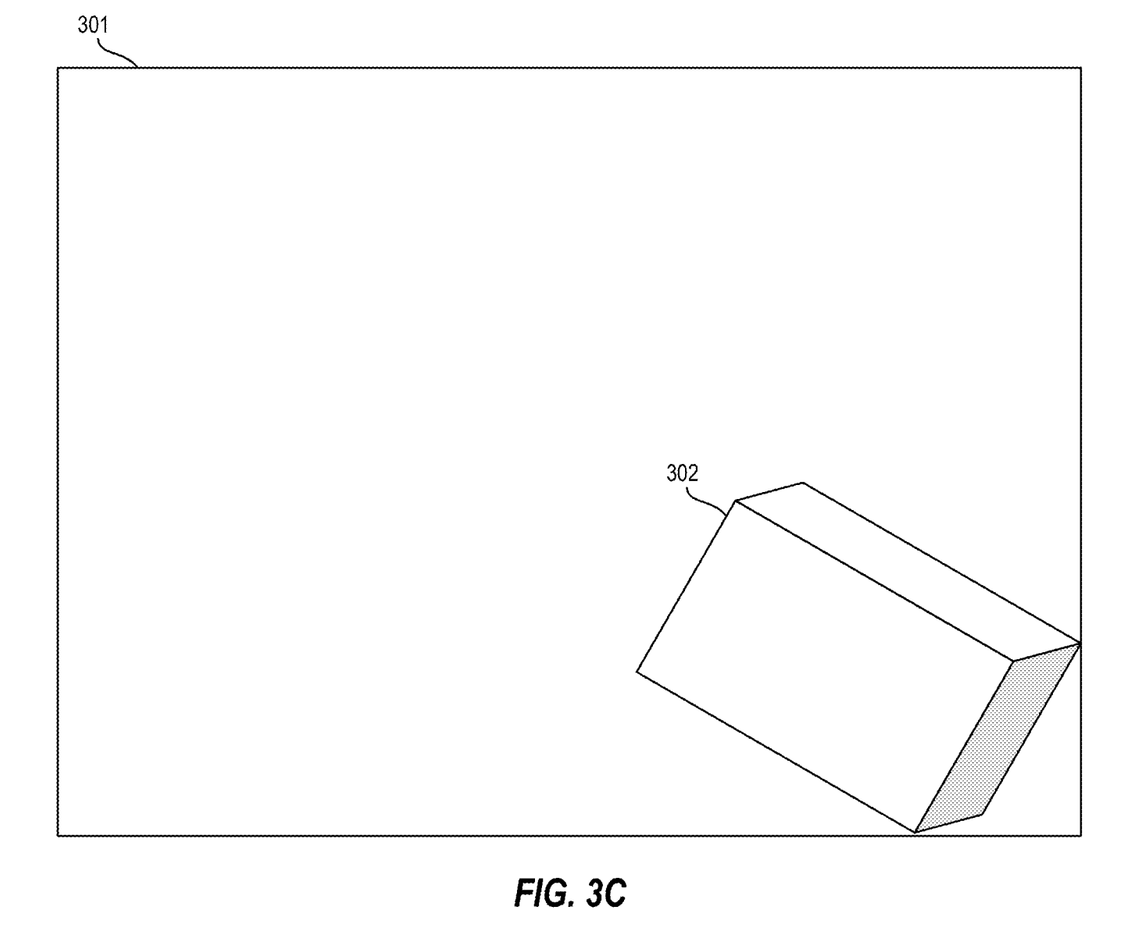
FIG. 3C depicts a virtual reality environment according to one or more embodiments described herein.
Figure 3D:
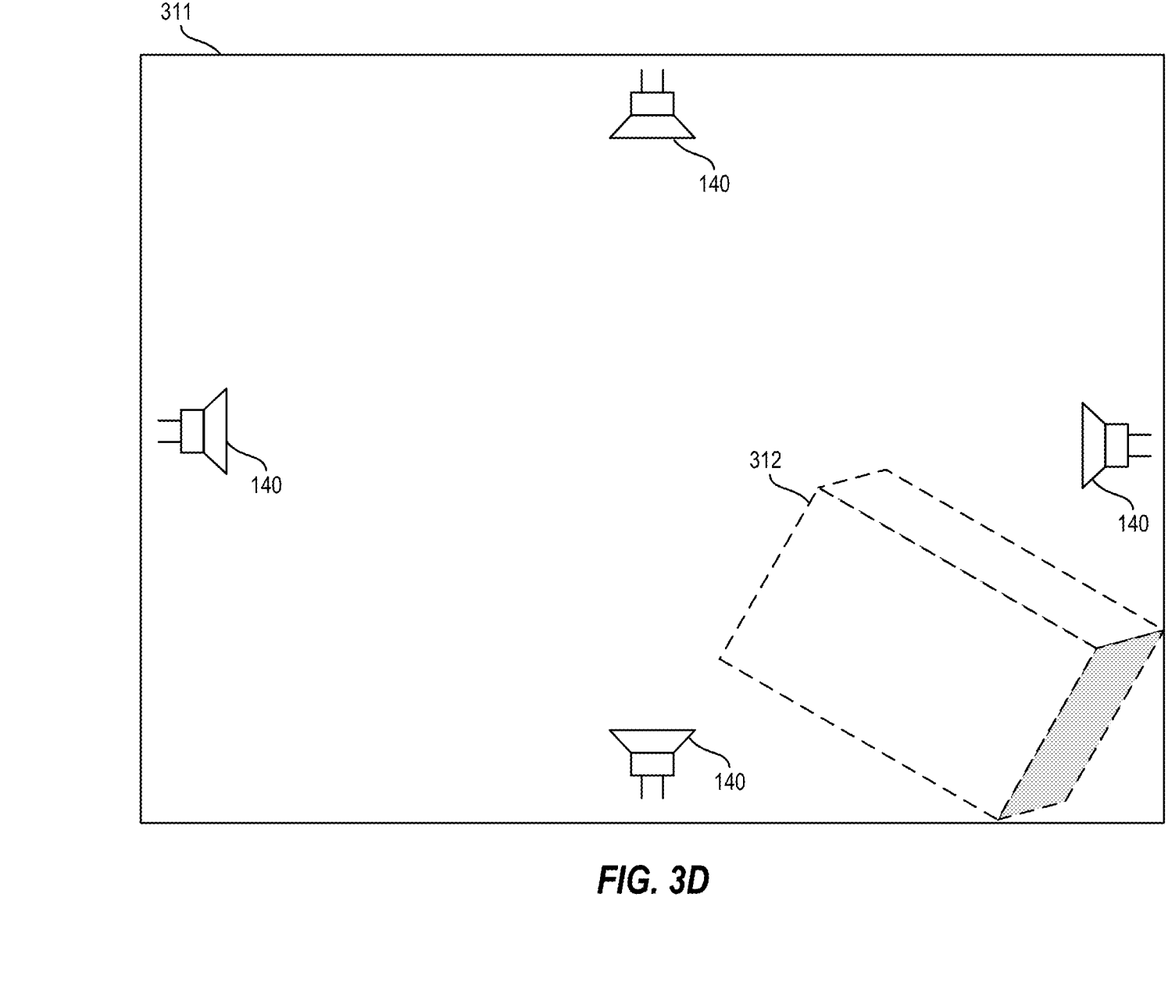
FIG. 3D depicts a real-world environment according to one or more embodiments described herein.

When the pose or shape of the virtual object 302 changes, the processing system 100 can cause the acoustic representation 312 can be updated to reflect the change. For example, as shown in FIG. 3C, the pose of the virtual object 302 changes. Correspondingly, in FIG. 3D, the acoustic representation 312 is updated to reflect the change to the virtual object 302.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
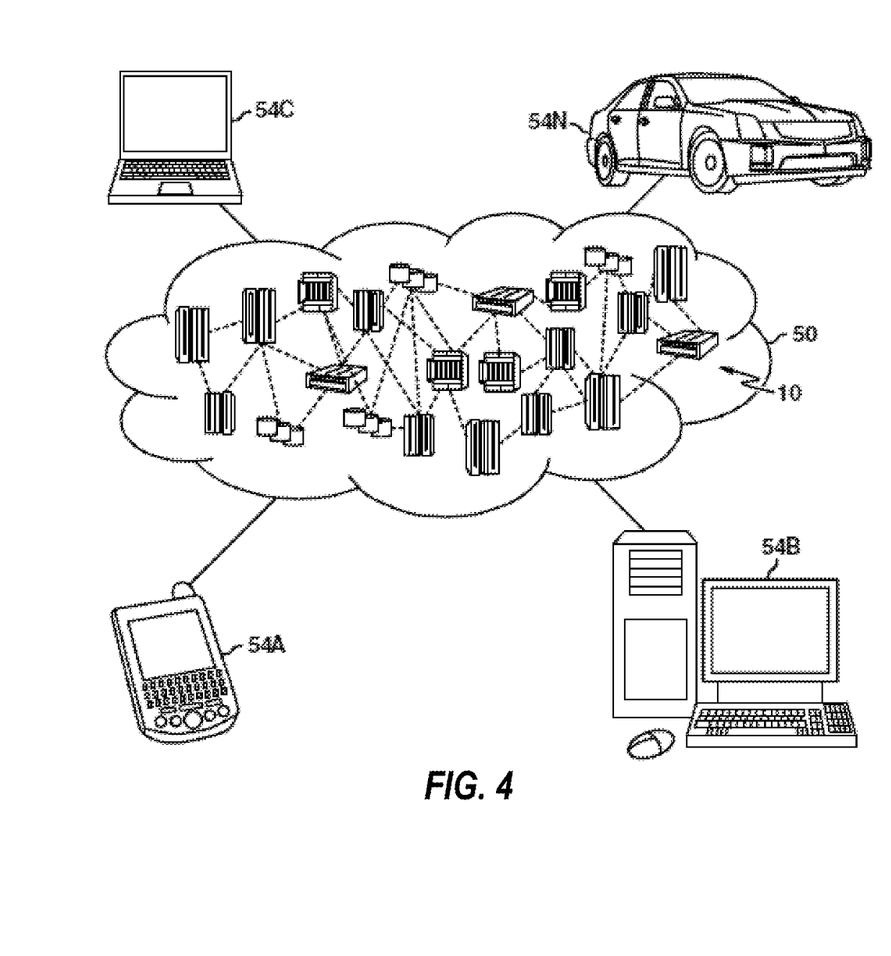
FIG. 4 depicts a cloud computing environment according to one or more embodiments described herein.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
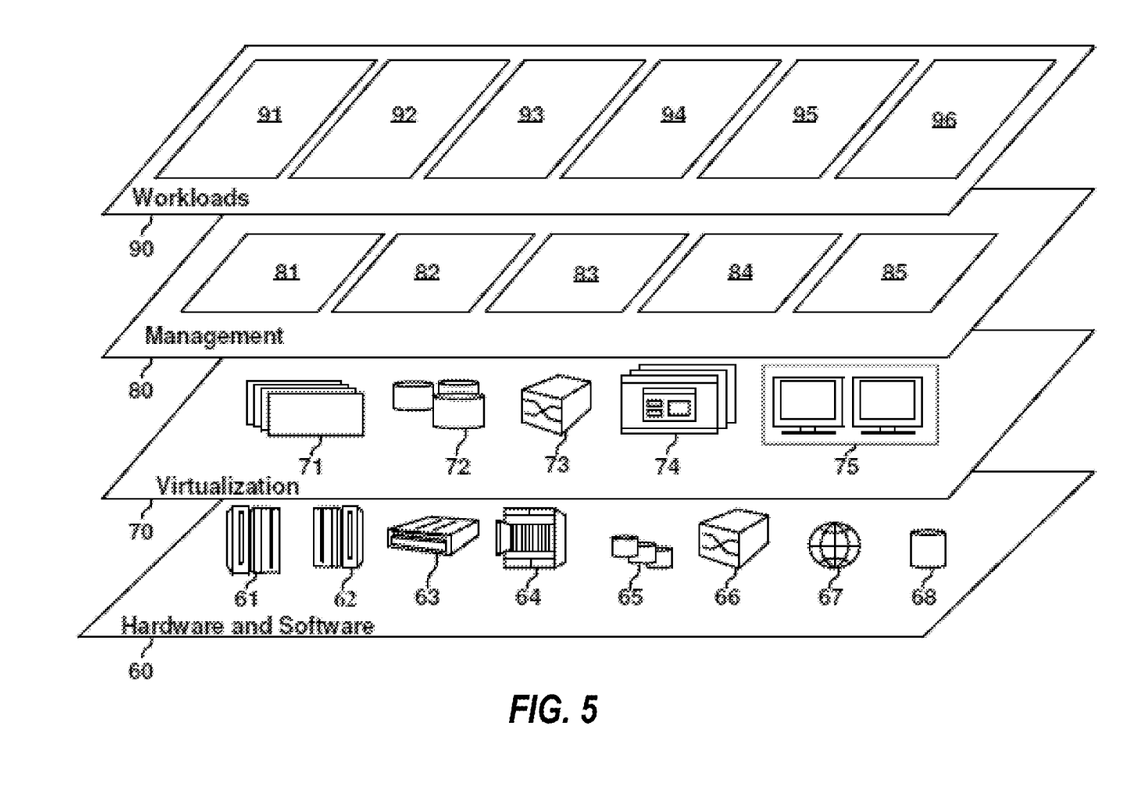
FIG. 5 depicts abstraction model layers according to one or more embodiments described herein.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating acoustic representations of virtual objects 96.

It is understood that one or more embodiments described herein is capable of being implemented in conjunction with any other type of computing environment now known or later developed. For example, FIG. 6 depicts a block diagram of a processing system 600 for implementing the techniques described herein. In accordance with one or more embodiments described herein, the processing system 600 is an example of a cloud computing node 10 of FIG. 4. In examples, processing system 600 has one or more central processing units ("processors" or "processing resources") 621a, 621b, 621c, etc. (collectively or generically referred to as processor(s) 621 and/or as processing device(s)). In aspects of the present disclosure, each processor 621 can include a reduced instruction set computer (RISC) microprocessor. Processors 621 are coupled to system memory (e.g., random access memory (RAM) 624) and various other components via a system bus 633. Read only memory (ROM) 622 is coupled to system bus 633 and may include a basic input/output system (BIOS), which controls certain basic functions of processing system 600.

Further depicted are an input/output (I/O) adapter 627 and a network adapter 626 coupled to system bus 633. I/O adapter 627 may be a small computer system interface (SCSI) adapter that communicates with a hard disk 623 and/or a storage device 625 or any other similar component. I/O adapter 627, hard disk 623, and storage device 625 are collectively referred to herein as mass storage 634. Operating system 640 for execution on processing system 600 may be stored in mass storage 634. The network adapter 626 interconnects system bus 633 with an outside network 636 enabling processing system 600 to communicate with other such systems.

A display (e.g., a display monitor) 635 is connected to system bus 633 by display adapter 632, which may include a graphics adapter to improve the performance of graphics intensive applications and a video controller. In one aspect of the present disclosure, adapters 626, 627, and/or 632 may be connected to one or more I/O busses that are connected to system bus 633 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 633 via user interface adapter 628 and display adapter 632. A keyboard 629, mouse 630, and speaker 631 may be interconnected to system bus 633 via user interface adapter 628, which may include, for example, a Super I/O chip integrating multiple device adapters into a single integrated circuit.

In some aspects of the present disclosure, processing system 600 includes a graphics processing unit 637. Graphics processing unit 637 is a specialized electronic circuit designed to manipulate and alter memory to accelerate the creation of images in a frame buffer intended for output to a display. In general, graphics processing unit 637 is very efficient at manipulating computer graphics and image processing, and has a highly parallel structure that makes it more effective than general-purpose CPUs for algorithms where processing of large blocks of data is done in parallel.

Thus, as configured herein, processing system 600 includes processing capability in the form of processors 621, storage capability including system memory (e.g., RAM 624), and mass storage 634, input means such as keyboard 629 and mouse 630, and output capability including speaker 631 and display 635. In some aspects of the present disclosure, a portion of system memory (e.g., RAM 624) and mass storage 634 collectively store the operating system 640 such as the AIX® operating system from IBM Corporation to coordinate the functions of the various components shown in processing system 600.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving virtual object data about a virtual object in a virtual reality environment;
   determining a shape of the virtual object;
   determining a pose of the virtual object in the virtual reality environment;
   creating, based at least in part on the shape of the virtual object and the pose of the virtual object, an acoustic representation of the virtual object within a real-world environment using at least one electroacoustic transducer to generate acoustic signals, wherein the acoustic representation includes quasi-solid surfaces formed using sound waves from the at least one electroacoustic transducer.

2. The computer-implemented method of claim 1, further comprising:
   detecting a change of at least one of the shape of the virtual object or the pose of the virtual object; and
   adjusting the acoustic representation of the virtual object within the real-world environment based at least in part on the change of at least one of the shape of the virtual object or the pose of the virtual object.

3. The computer-implemented method of claim 1, further comprising:
   determining a pose of a user interacting with the virtual reality environment.

4. The computer-implemented method of claim 3, further comprising:
   detecting a change of the pose of the user; and adjusting the acoustic representation of the virtual object within the real-world environment based at least in part on the change of the pose of the user.

5. The computer-implemented method of claim 1, wherein the at least one electroacoustic transducer comprises a first electroacoustic transducer and a second electroacoustic transducer.

6. The computer-implemented method of claim 5, wherein the first electroacoustic transducer is disposed within the real-world environment in a known relationship to the second electroacoustic transducer.

7. The computer-implemented method of claim 1, wherein the pose of the virtual object comprises an orientation of the virtual object in the virtual reality environment and a location of the virtual object in the virtual reality environment.

8. The computer-implemented method of claim 1, wherein the virtual object data is three-dimensional (3D) model data.

9. The computer-implemented method of claim 1, wherein the virtual object data is computer aided design (CAD) data received from a CAD source.

10. A system comprising:
a memory comprising computer readable instructions; and
a processing device for executing the computer readable instructions, the computer readable instructions controlling the processing device to perform operations comprising:
receiving virtual object data about a virtual object in a virtual reality environment;
determining a shape of the virtual object;
determining a pose of the virtual object in the virtual reality environment;
creating, based at least in part on the shape of the virtual object and the pose of the virtual object, an acoustic representation of the virtual object within a real-world environment using at least one electroacoustic transducer to generate acoustic signals, wherein the acoustic representation includes quasi-solid surfaces formed using sound waves from the at least one electroacoustic transducer.

11. The system of claim 10, the operations further comprising:
detecting a change of at least one of the shape of the virtual object or the pose of the virtual object; and
adjusting the acoustic representation of the virtual object within the real-world environment based at least in part on the change of at least one of the shape of the virtual object or the pose of the virtual object.

12. The system of claim 10, the operations further comprising:

determining a pose of a user interacting with the virtual reality environment.

13. The system of claim 12, the operations further comprising:
detecting a change of the pose of the user; and
adjusting the acoustic representation of the virtual object within the real-world environment based at least in part on the change of the pose of the user.

14. The system of claim 10, wherein the at least one electroacoustic transducer comprises a first electroacoustic transducer and a second electroacoustic transducer.

15. The system of claim 14, wherein the first electroacoustic transducer is disposed within the real-world environment in a known relationship to the second electroacoustic transducer.

16. The system of claim 10, wherein the pose of the virtual object comprises an orientation of the virtual object in the virtual reality environment and a location of the virtual object in the virtual reality environment.

17. The system of claim 10, wherein the virtual object data is three-dimensional (3D) model data.

18. The system of claim 10, wherein the virtual object data is computer aided design (CAD) data received from a CAD source.

19. A computer program product comprising a computer readable storage medium having program instructions embodied therewith, the program instructions executable by a processor to cause the processor to perform operations comprising:
receiving virtual object data about a virtual object in a virtual reality environment;
determining a shape of the virtual object;
determining a pose of the virtual object in the virtual reality environment;
creating, based at least in part on the shape of the virtual object and the pose of the virtual object, an acoustic representation of the virtual object within a real-world environment using at least one electroacoustic transducer to generate acoustic signals, wherein the acoustic representation includes quasi-solid surfaces formed using sound waves from the at least one electroacoustic transducer.

20. The computer program product of claim 19, the operations further comprising:
detecting a change of at least one of the shape of the virtual object or the pose of the virtual object; and
adjusting the acoustic representation of the virtual object within the real-world environment based at least in part on the change of at least one of the shape of the virtual object or the pose of the virtual object.

* * * * *